US008601763B2

(12) United States Patent
Bui

(10) Patent No.: US 8,601,763 B2
(45) Date of Patent: Dec. 10, 2013

(54) FASTENER FOR LIGHTWEIGHT CONCRETE PANEL AND PANEL ASSEMBLY

(76) Inventor: Thuan Bui, Philadelphia, PA (US)

(*) Notice: Subject to any disclaimer, the term of this patent is extended or adjusted under 35 U.S.C. 154(b) by 226 days.

(21) Appl. No.: 12/798,365

(22) Filed: Apr. 3, 2010

(65) Prior Publication Data

US 2011/0083390 A1  Apr. 14, 2011

Related U.S. Application Data

(63) Continuation-in-part of application No. 12/655,032, filed on Dec. 22, 2009, now abandoned, which is a continuation-in-part of application No. 12/583,607, filed on Aug. 23, 2009, now abandoned, and a continuation-in-part of application No. 12/587,851, filed on Oct. 14, 2009, now abandoned.

(51) Int. Cl.
  *E04B 2/30* (2006.01)
(52) U.S. Cl.
  USPC .............. 52/483.1; 52/415; 52/422; 52/474; 52/344
(58) Field of Classification Search
  USPC ........ 52/483.1, 414, 415, 422, 443, 474, 289, 52/344, 361–363
  See application file for complete search history.

(56) References Cited

U.S. PATENT DOCUMENTS

| 2,157,374 | A | * | 5/1939 | Wells, Jr. ...................... 52/363 |
| 4,457,315 | A | * | 7/1984 | Bennish ....................... 600/517 |
| 4,571,909 | A | * | 2/1986 | Berghuis et al. ............. 52/309.8 |
| 4,602,467 | A |   | 7/1986 | Schilger |
| 4,885,884 | A |   | 12/1989 | Schilger |
| 4,909,007 | A |   | 3/1990 | Bodnar |
| 5,759,001 | A | * | 6/1998 | Smith ............................ 411/43 |
| 6,125,608 | A | * | 10/2000 | Charlson ....................... 52/847 |
| 6,151,858 | A |   | 11/2000 | Ruiz |

* cited by examiner

*Primary Examiner* — William Gilbert
*Assistant Examiner* — Patrick Maestri
(74) *Attorney, Agent, or Firm* — Bui Garcia-Zamor; Jessica H. Bui, Esq.

(57) ABSTRACT

The lightweight concrete panel is comprised of a thin concrete slab, a standard steel stud frame, optional insulation strips to increase its thermal performance for exterior wall applications, and specially engineered rivets or screws that connect the thin concrete slab to the metal frame. The specially engineered rivet has a protruding and shaped head that acts as an anchor when embedded in the hardened concrete slab and has an optional elastic cover in its embedded head to allow slight movement of the concrete slab. The engineered screw with an elastic cover can also be used as the connecting device that allows slight movement of the concrete slab.

14 Claims, 13 Drawing Sheets

FASTENER FOR LIGHTWEIGHT CONCRETE PANEL AND PANEL ASSEMBLY

CROSS-REFERENCE TO RELATED APPLICATIONS

This application is a continuation-in-part (CIP) application of application Ser. No. 12/655,032 filed on Dec. 22, 2009, now abandoned, which is a continuation-in-part (CIP) application of application Ser. No. 12/587,851 filed on Oct. 14, 2009, now abandoned, which is also a continuation-in-part (CIP) application of application Ser. No. 12/583,607 filed on Aug. 23, 2009, now abandoned.

BACKGROUND OF THE INVENTION

1. Field of the Invention

The present invention relates to lightweight concrete panel with a supporting steel frame and the device that connects the concrete facing to the steel frame.

2. Description of the Related Art

The following patents define the current state of the art:

Schilger, U.S. Pat. No. 4,602,467 describes a building panel with a supporting steel frame attached to a concrete slab. The attaching mechanism that connects the steel frame to the concrete slab is part of the stud members. The flange of one side of the stud member is punched and modified in various shapes intending to act as anchor when its entire side is embedded into the concrete slab. Because of the stud's flange embedment into the concrete, the panel is considered a composite panel where both the concrete layer and the steel frame plays important role on carrying load.

Schilger, U.S. Pat. No. 4,885,884 describes a building panel with a supporting steel frame attached to a concrete slab. The attaching mechanism that connects the steel frame to the concrete slab is part of the stud members. The attaching device of this panel is not one long section extending one whole side of the stud member like his earlier art U.S. Pat. No. 4,602,467. Instead, the multiple connecting devices are the intermittingly punched and bent portions in the C-section stud's flange. The punched and bent sections can be L-shaped, V-shaped, and T-shaped sections that run parallel to the stud member and extend into the concrete slab, acting as the connecting devices.

Ruiz, U.S. Pat. No. 6,151,858 has a similar concept as Schilger in U.S. Pat. No. 4,885,884. Ruiz's intermittingly punched and bent sections in the stud's flange have a different shape and bent direction. Ruiz's protruding L-shaped is narrower than Schilger and bent differently. Like Schilger's protruding sections, Ruiz's punched tabs are the connecting devices that are part of the stud member.

Bodnar, U.S. Pat. No. 4,909,007 has a similar concept as Schilger, U.S. Pat. No. 4,602,467. One entire side of the C-section stud is punched and bent into one L-shaped flange, forming one long integrated attaching device to be embedded into a concrete slab. The differences in Bodnar's art are the openings in the embedded L-shaped junction flange and the large opening in the stud web area. The openings in the embedded junction flange are claimed to enable material to flow through and form a stronger concrete in the local region. The large openings in the stud web are meant to limit the thermal conductivity from one side to the other through reducing the thermal pathway or steel area in the stud web.

There are three major problems that associate with all mentioned arts: first is that they will need specially designed machinery to create such special stud with integrated connecting mean; second is their poor thermal performance; and third is the meeting of the building code specifications. Generally, the cost of specially engineered machinery to produce such modified stud is expensive and prohibiting. The thermal performance of Ruiz's and Schilger's wall panels is poor due to the direct material contact between the stud flange and the exterior concrete slab. Metal has high temperature conductivity and the heat from the exterior concrete flows right though the metal material of the stud to the inside stud flange. Although Bodnar's opened web stud is an improvement in reducing thermal conductivity in the stud web, the cost of machinery that produces the openings in stud web is expensive and prohibiting due to its complex process. Bodnar's opened web stud is an improvement, but the bottom and top tracks in his steel frame still have solid web so the panel still has poor thermal performance in those areas of the panel. In load-bearing applications, Bodnar and Schilger's wall panel will not meet the current International Building Code specifications in many parts of the country and the world. Little is known about the composite action between the concrete slab and the steel frame in their design. There is no guidance in the code specifications to cover such panel constructions. Assuming any unique composite panel is tested and proven to have structural properties, the submitting of its data and getting it specified in the code specifications can be a very long and costly process. The wide adoption of any unique composite panel is very unlikely because code specifications are written to encompass a type of construction not of any specific product. Previous arts overlooked these three major issues. The present invention was developed to overcome these major problems inherent in all prior arts.

SUMMARY OF THE INVENTION

This invention is of a panel construction and the unique components that make it. The lightweight concrete panel is comprised of a thin concrete slab, a standard stud frame that can be load-bearing or non-load-bearing that is well studied optional insulation strips to increase thermal performance in exterior wall applications, and novel anchoring rivets with protruding head as the preferred concrete-to-frame connecting device. Other optional concrete-to-frame connecting devices can be the combination of ordinary blind rivets and bent steel brackets that act as concrete anchors or screws with elastic covering that connect the concrete slab to the metal frame.

The standard steel studs in the supporting frame are manufactured by ordinary roll former or automated roll former with rivet or screw holes punched in stud flange. The optional insulation strip is ⅛" to 1" thick, extruded foam strip with adhesive backing. The insulating foam can be made from different materials to have the desired insulating properties. Some rigidity is preferred for easy handling during manufacturing process. The insulating strip can have marking or pre-punch holes that will align with the holes in the stud flange for easy installation. Maintaining ⅛" to 1" air space between the concrete and steel frame will be sufficient thermal break between the concrete and steel frame when insulation strip is not used. The anchoring rivet with protruding head is the preferred connecting device that connects the concrete slab to the supporting steel frame. The steel stud frame can have steel shear bracing in the interior side of the frame to meet shear load requirements as specified in building code specifications.

DETAILED DESCRIPTION OF THE INVENTION

Figure 1:
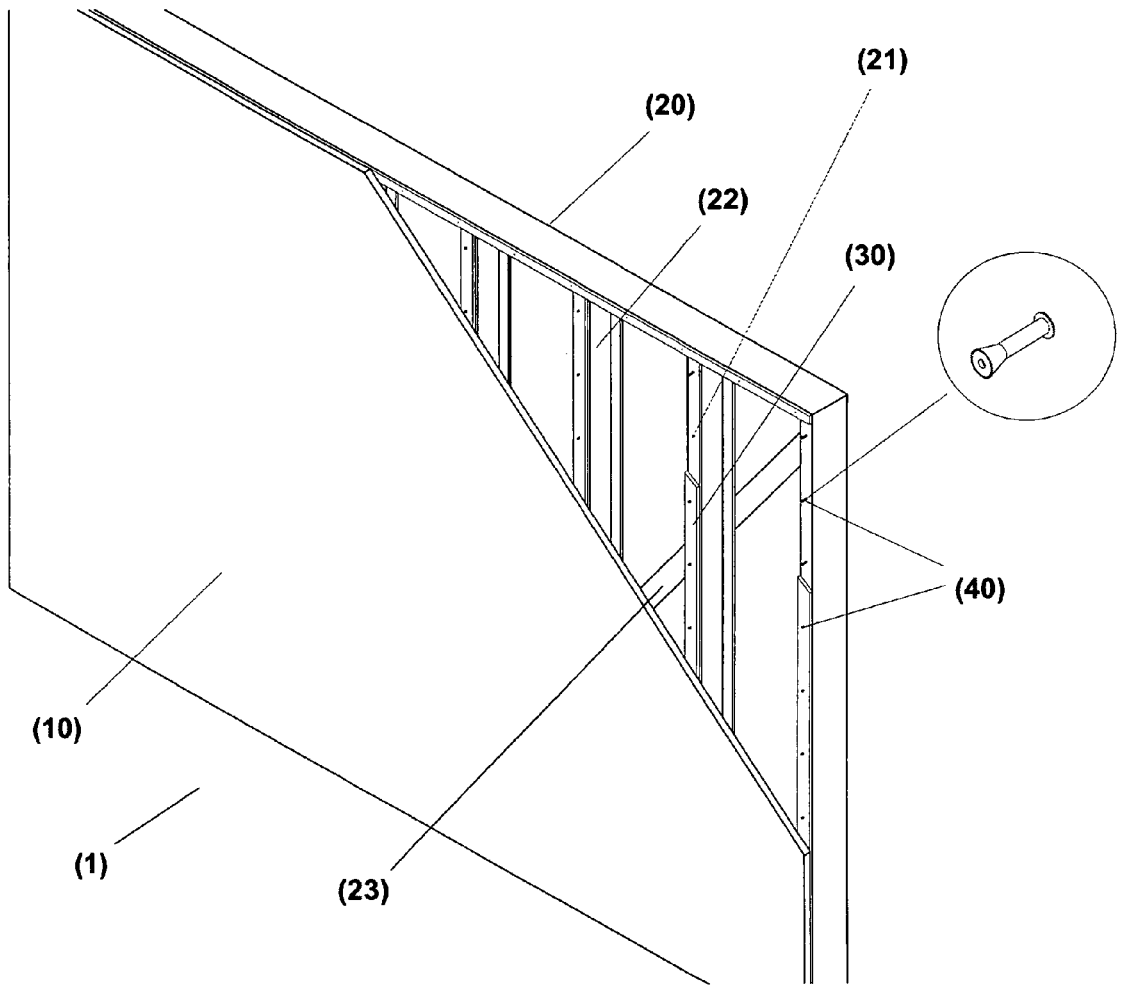
FIG. 1 illustrates the basic construction of present invention with its components.

FIG. 1 illustrates an embodiment of the invention very well. The concrete panel (1) is comprised of a standard steel stud frame (20) with pre-punch holes (21) for concrete-to-stud connectors in each standard C-section stud (22), a thin ordinary concrete slab with steel mesh reinforcement or a very thin ECC (engineered cementitious composite) concrete with high amount of micro fibers as the primary reinforcement (10), optional insulating strips (30) made of various extrudable materials with high insulating property in exterior wall application, optional steel shear bracing (23) in the interior side of the frame (20) when load-bearing is required, and the specially engineered anchoring rivet (40) as the preferred connecting device that connects the concrete slab (10) to the steel studs (22) of the steel frame (20).

The usage of standard shaped stud (22) of heavy gauge steel and size and steel shear bracing (23) in the steel frame (20) will allow the panel to meet the building code specifications readily and will require no specialized machinery or additional machine to modify the stud flange. Implementation of this system will require much less capital at the start and its market acceptance will be higher due to usage of standard C-section studs. Steel shear bracing (30) can add additional support in load-bearing applications. Also, in utilizing the standard stud frame system also has another major advantage: we can now use the latest labor-saving technology like automated roll forming technology from FRAMECAD Group (a New Zealand company) to reduce stud frame manufacturing cost. The preferred steel frame manufacturing process would require an automated roll former that can cut both studs and tracks to required sizes, and punch holes for rivets (40) in each stud. When this technology is applied, complexity of process and labor cost is greatly reduced.

The insulating strip (30) is designed to limit the thermal conductivity in the stud flange area. Its has the width of the stud flange, thickness between 1/16" to 1", made of various insulating materials, has adhesive backing, and has enough rigidity to counter the weight pressure of the concrete slab when the panel is lifted or moved. In exterior applications, this insulating strip will greatly increase the panel's thermal performance. The preferred strip (30) can be extruded rigid foam and has pre-punched holes or marking on strip surface for connector rivets (40) to go through. This insulating strip (30) is an optional component as the wall panel (1) can be cast with air gap between the steel frame (10) and the concrete (20) during the manufacturing process and then can be filled at building site or factory with spray foam that will have the similar effect as having the insulating strips (30).

Figure 2:
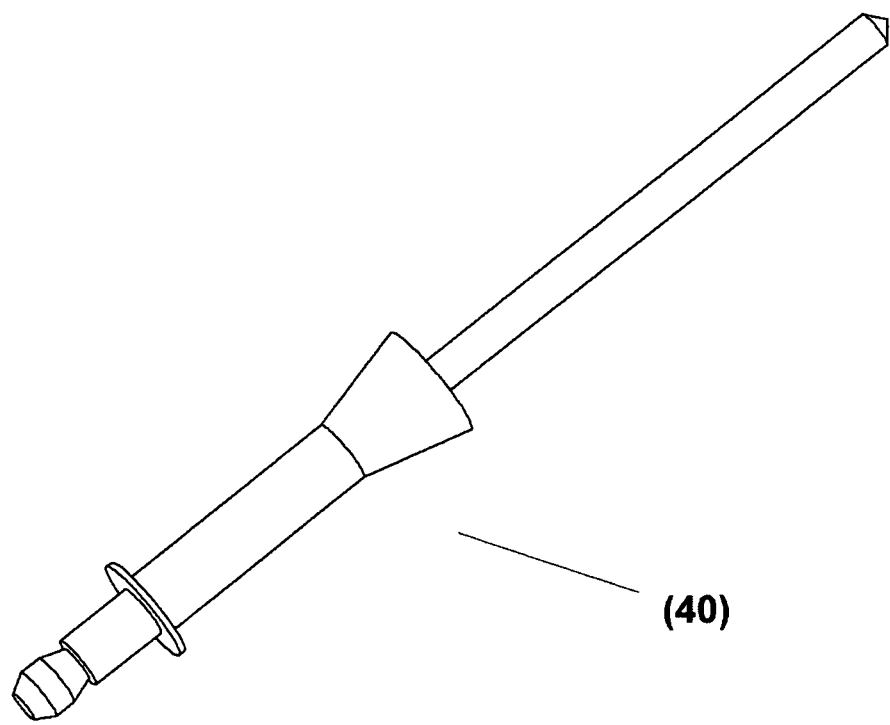
FIG. 2 illustrates the anchoring rivet with protruding head as a connecting device that connects concrete slab to the steel frame.
Figure 3:
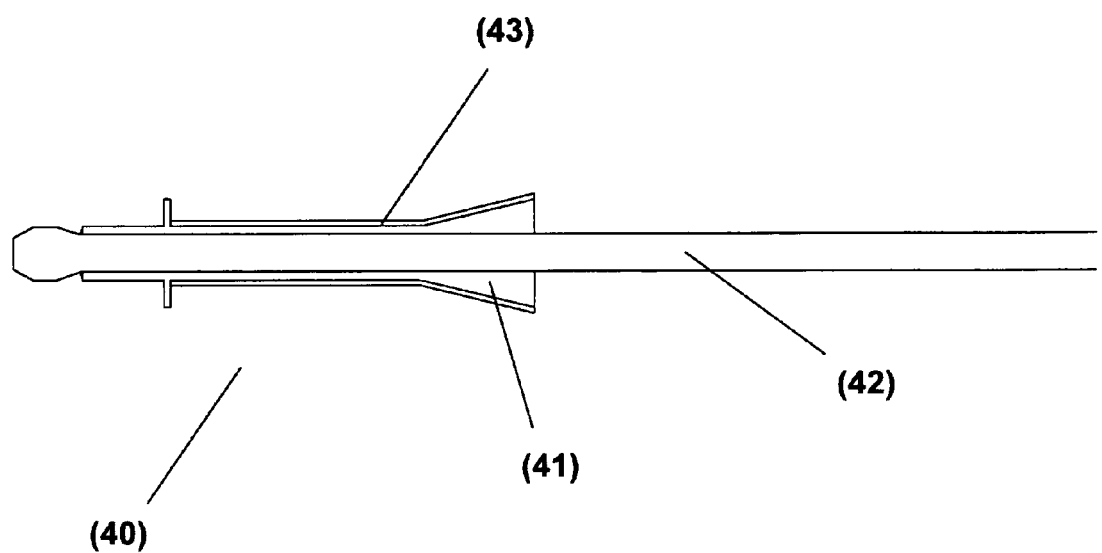
FIG. 3 illustrates a cross-section of the anchoring rivet shown in FIG. 2.
Figure 4:
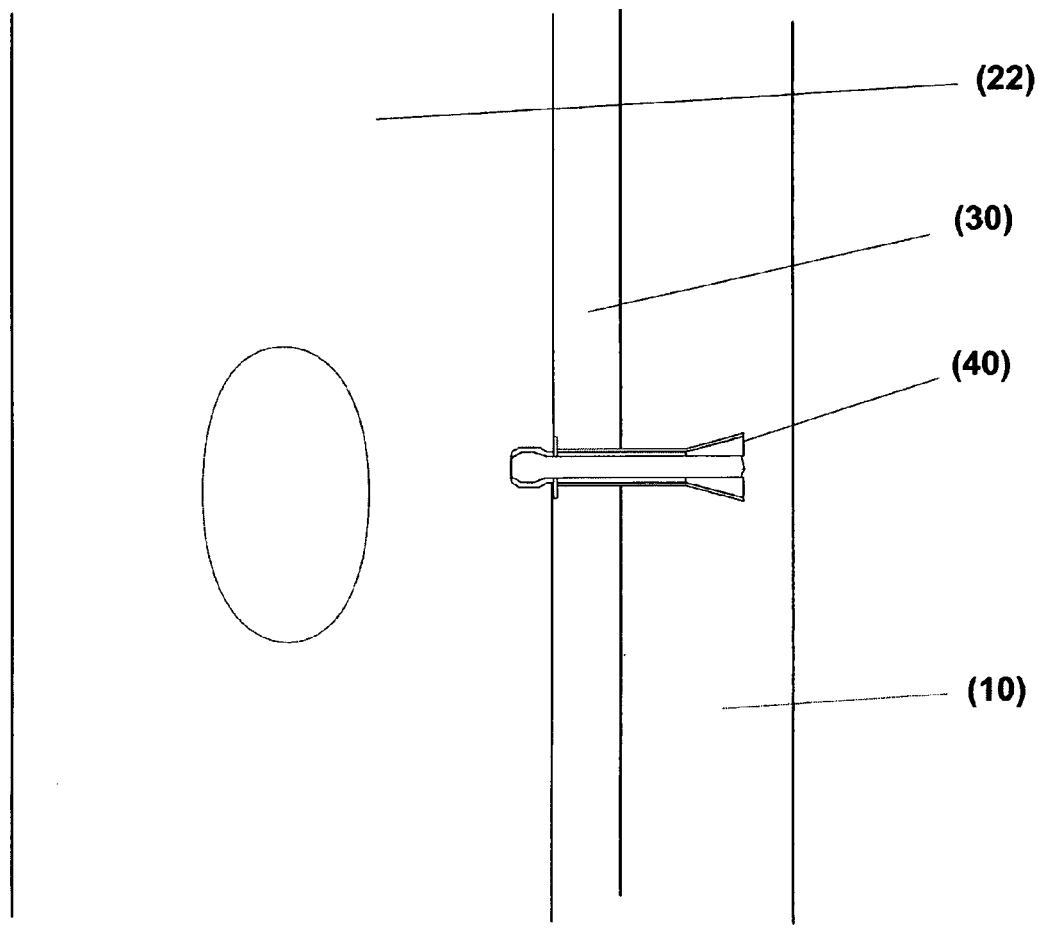
FIG. 4 illustrates a cross-section of an exterior wall panel shown in FIG. 1 with its components.
Figure 5:
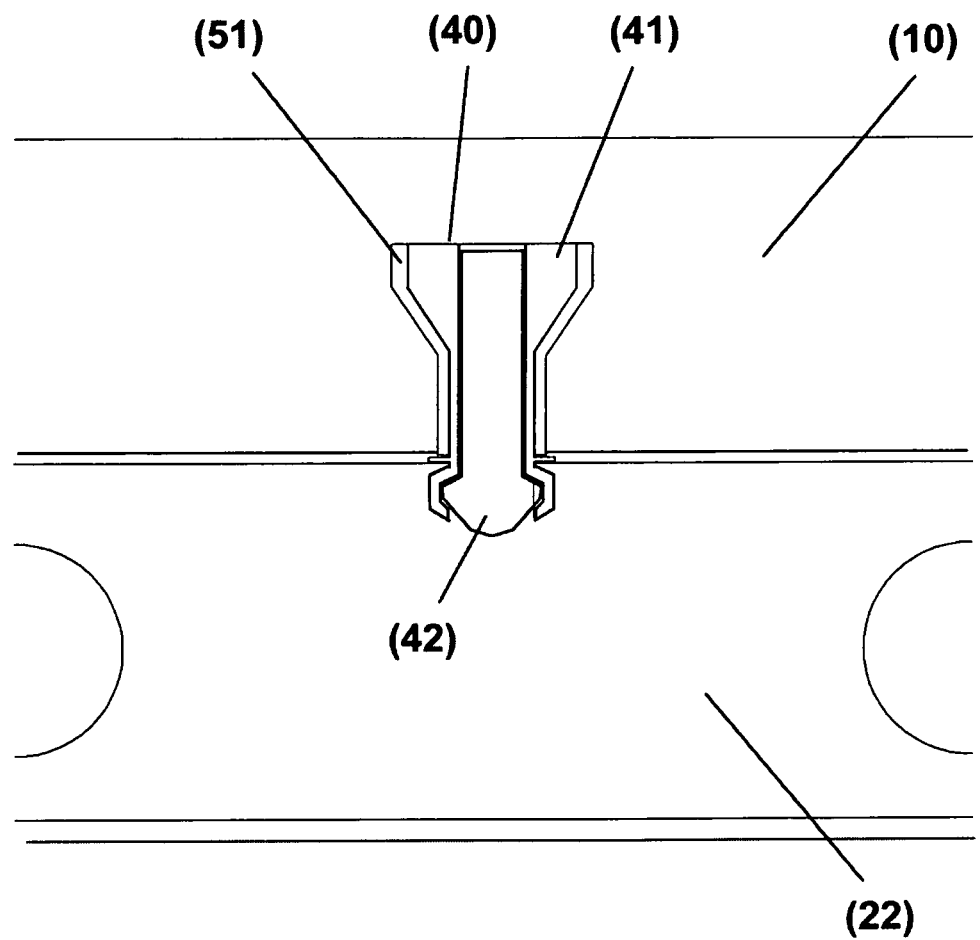
FIG. 5 illustrates a cross-section of an interior panel where the insulating strip is unnecessary.
Figure 7:
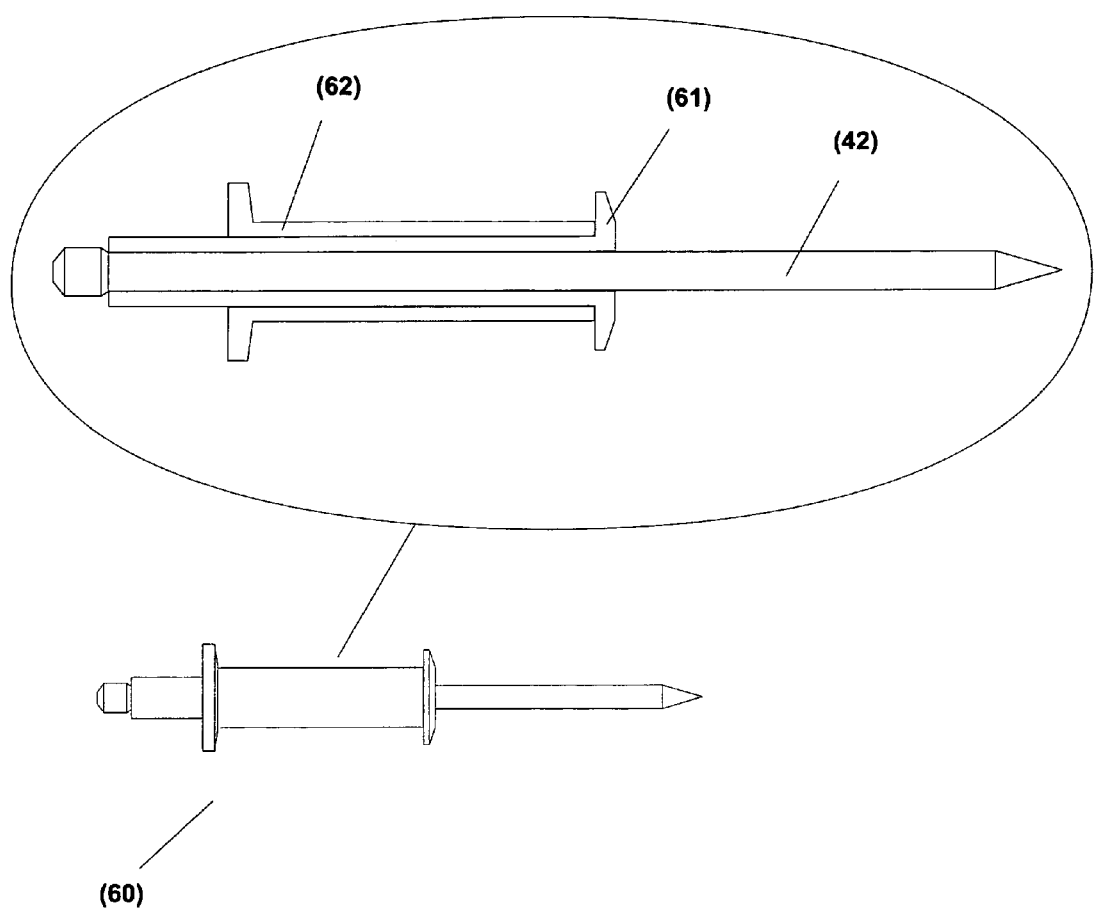
FIG. 7 illustrates another design of an anchoring blind rivet where the rivet body is comprised of two ordinary blind rivet bodies fitted tightly together with heads in opposite ends to effectively form the protruding rivet head.
Figure 8:
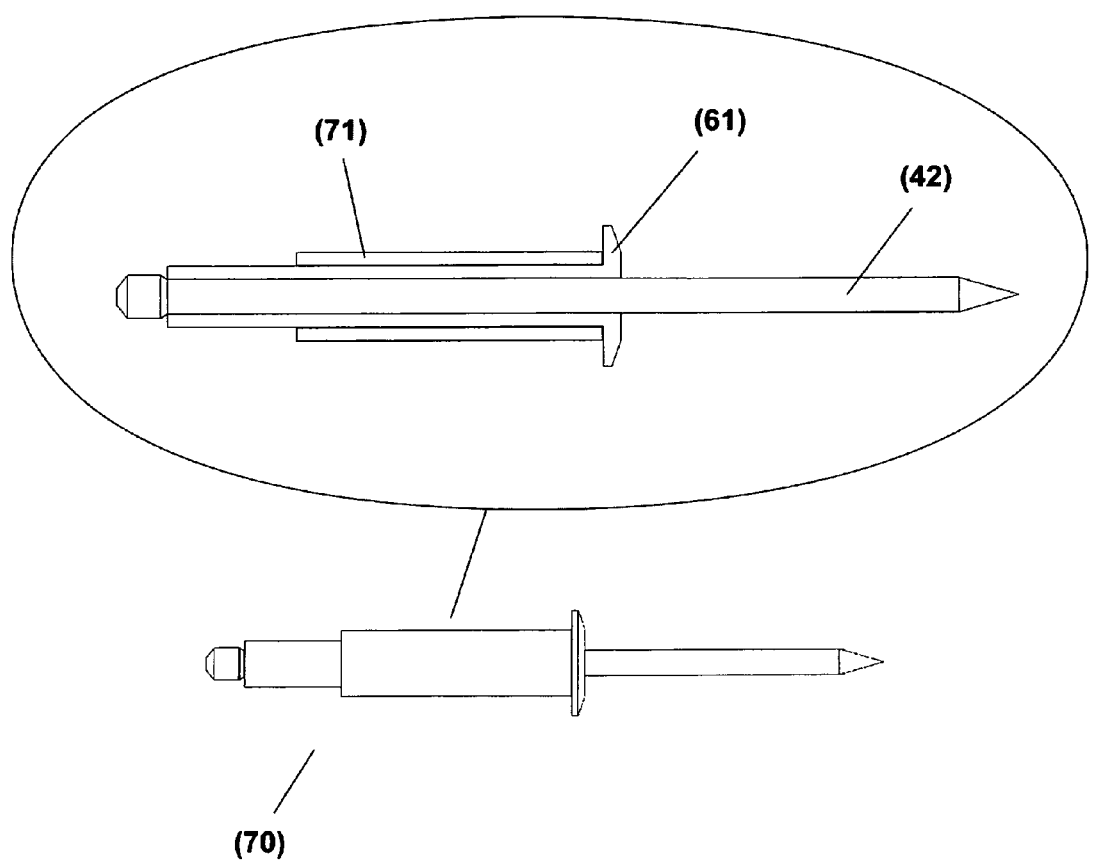
FIG. 8. illustrates another design of an anchoring blind rivet where the rivet body is comprised of a slotted pin or sleeve fitted tightly over an ordinary blind rivet body, and where the slotted pin or sleeve portion of the rivet body is the protruding rivet head.
Figure 9:
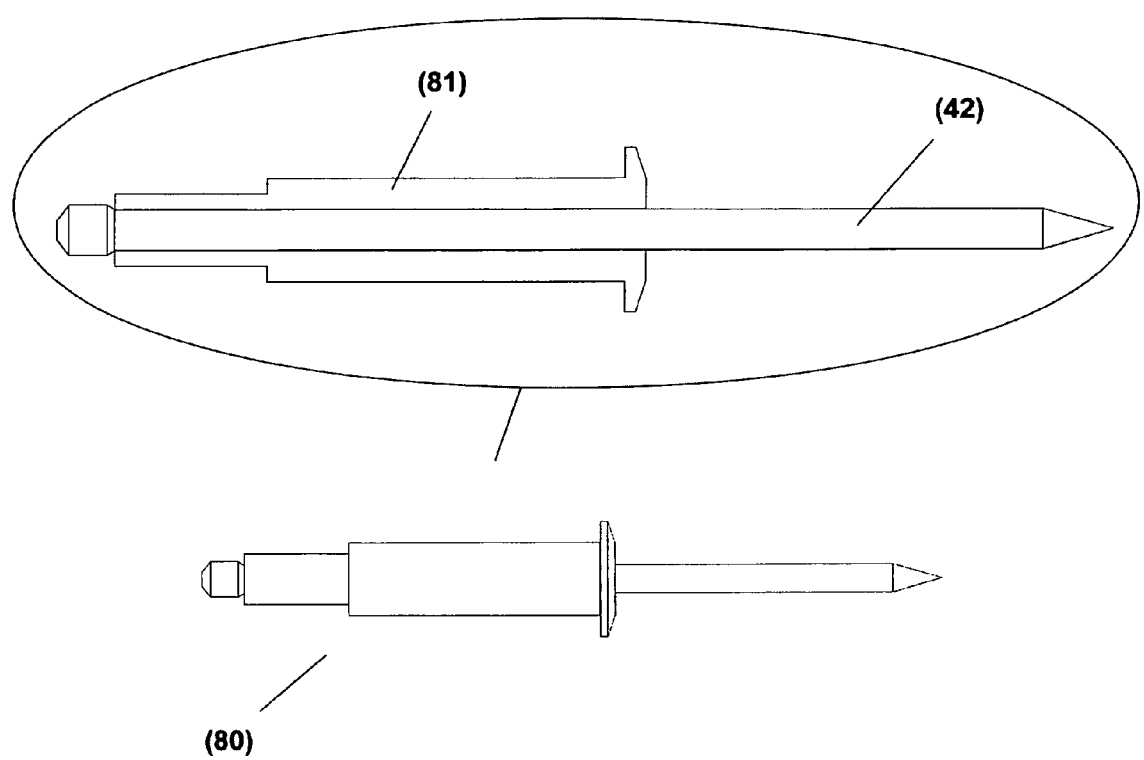
FIG. 9. illustrates another design of a blind rivet where the rivet body is shaped like a step-up cylinder with a dome head, and where the thicker portion of the rivet body is the protruding rivet head.
Figure 11:
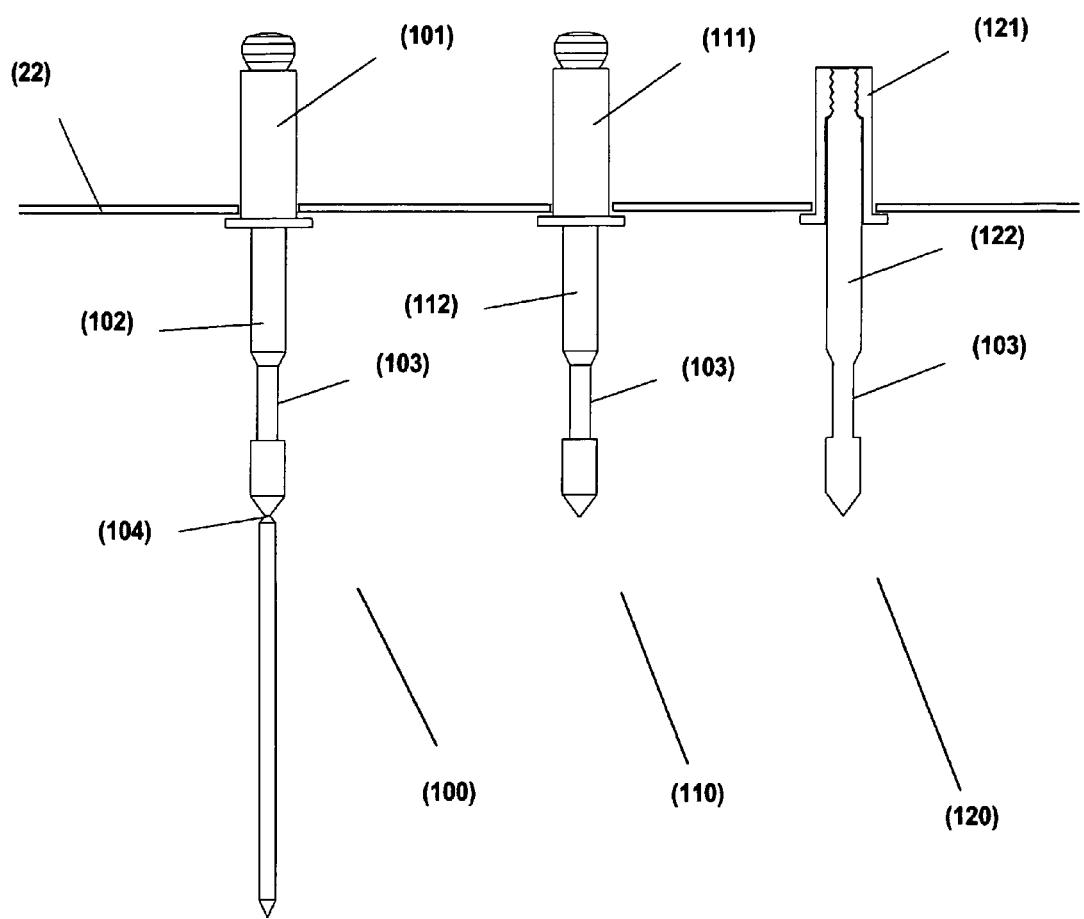
FIG. 11 illustrates another version of protruding head blind rivet with same functionality as previous version but has slightly different design.
Figure 12:
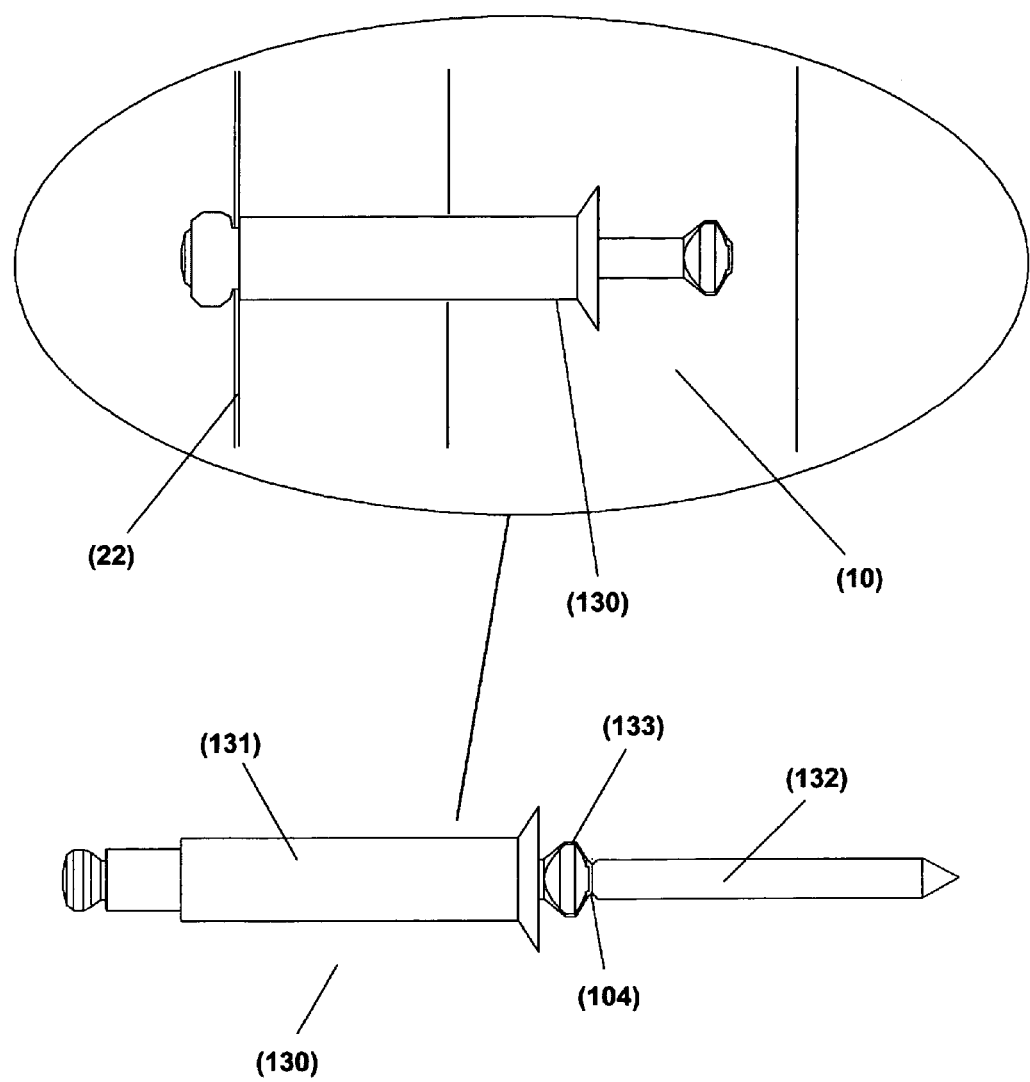
FIG. 12 illustrates yet another embodiment of the protruding head blind rivet that has the functionality as previous versions.
Figure 13:
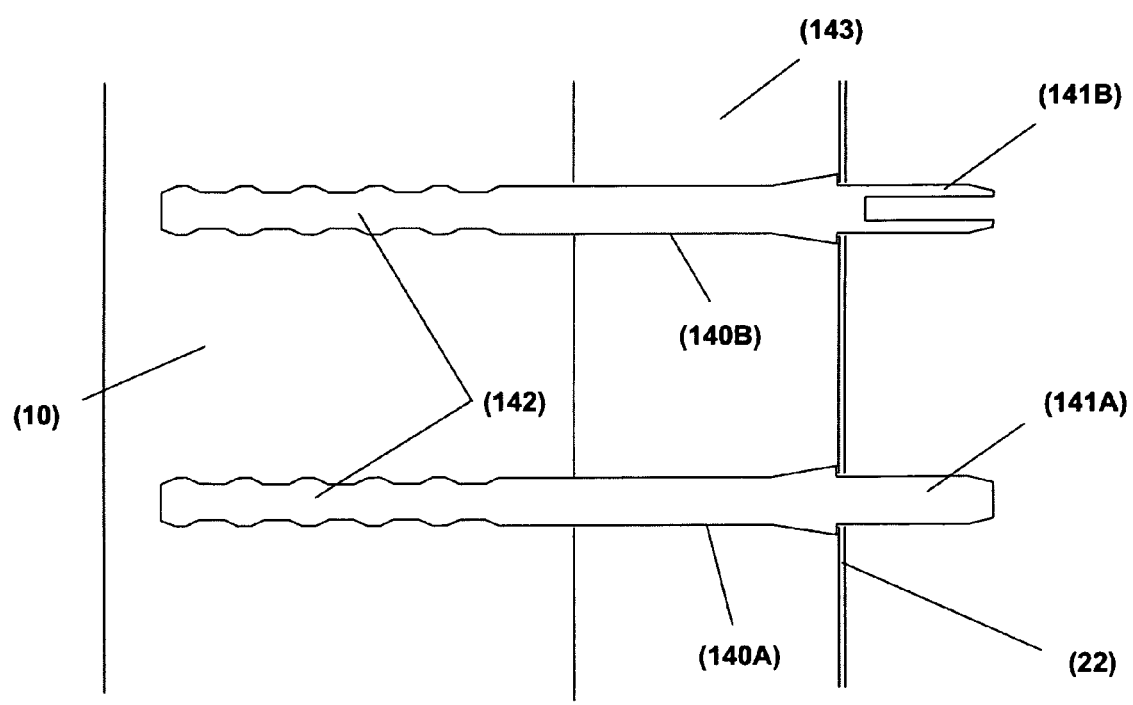
FIG. 13 illustrates yet another embodiment of the protruding head rivet design that has the same functionality as previous versions.

The preferred concrete-to-steel connecting device in the embodied panel is the specially engineered anchoring rivet with protruding head (40). The protruding rivet head can have many designs and shapes that serve as concrete anchoring mechanism. FIG. 2 illustrates one possible version of the anchoring rivet of blind rivet type (40). In this version, the blind rivet (40) has a protruding and modified rivet head that is shaped effectively to act as an anchor in the concrete. FIG. 3 shows the optional rivet cover (43) over the rivet head. The protruding rivet head can have various shapes that allow it to act as an anchor in the hardened concrete. The simplest rivet head shape is of a cone shape as shown in FIG. 3 and FIG. 4. The rivet cover (43) is made from various thermal plastic or elastic materials such as silicon or rubber. The usage of various thermal plastic covers in steel anchor is a general practice to help reduce the steel corrosion and reduce the thermal conductivity between the steel body and the concrete. The protective cover (43) may not be necessary if the rivet head (41) is made of stainless steel and the concrete slab (10) is sufficiently restrained with steel mesh reinforcement in standard concrete. However, when the concrete slab (10) is made of ECC (engineered cementitious composite) concrete and has only micro-fiber as the primary means of reinforcement, the higher dry shrinkage rate of the concrete material will cause the concrete slab (10) to shrink and move slightly more. The elastic rivet cover (43) is necessary to allow the concrete slab or plate (10) to move and reduce any internal stress of the concrete slab (10). If the shrinking concrete slab (10) is restrained the internal stress will crack concrete slab (10). This usage of elastic cover in any type of concrete anchor is novel and necessary to reduce internal stress of the concrete slab (10). The anchoring rivet is the preferred connecting device because it has great pull strength or holding strength and it is easy and faster to install. FIGS. 7, 8, 9, 11, and 12 illustrate other anchoring rivet designs that can serve as the connector. FIG. 7 illustrates a version of the protruding head blind rivet (60) where the protruding rivet head is comprised of two ordinary blind rivet bodies (61 and 62) with the smaller main rivet body (61) fitted tightly inside the larger rivet body (62). FIG. 8 illustrates another version of the protruding head blind rivet (70). The rivet body of this version is comprised of a long ordinary rivet body (61) and a simple slotted pin or sleeve (71) fitted tightly over the rivet body (61). FIG. 9 illustrates another version of the protruding head blind rivet (80) where the round rivet body (81) is shaped like a step-up cylinder. The thicker portion of the rivet body (81) is the protruding head extending from the steel frame surface. FIGS. 11 and 12 illustrate other versions of the protruding head blind rivet (100, 110, 120, and 130). FIG. 11 illustrates three protruding head bind rivet designs (100, 110, and 120), where the protruding rivet head of these three designs is protruding mandrel of the blind rivet. Normally, the mandrel of blind rivet does not extend beyond the plane of the substrate (22); but in this design, the protruding mandrel can have various shapes that provide the rivet the concrete anchoring ability. The first blind rivet design (100) is comprised of an ordinary blind rivet body (101) and a protruding mandrel (102) with shaped portion (103) that serves as the anchoring mean and the mandrel break-point (104) far in the protruding portion of the mandrel (102). The second blind rivet design (110) is similar to the first but without a mandrel break-point. This rivet will require a custom made rivet gun that will only pull the mandrel (103) and release it in place. The third blind rivet design (120) is similar to the second (110) except the rivet body is an ordinary rivet nut (121) and the mandrel (122) has a threaded end that screws to the rivet nut (121). FIG. 12 illustrates yet another possible protruding head rivet design (130). In this blind rivet design (130) the protruding head is both the protruding rivet body (131) and the protruding mandrel (132). The protruding mandrel (132) has a break-point outside the rivet body (131) beyond the shaped portion (133) in the mandrel stem that serves as the anchoring mean. Blind rivet designs with protruding heads are very flexible in field applications. In factory fabrication, a solid or semi-hollow rivet design with shaped protruding head can be used and is more economical. FIG. 13 illustrates an example of a solid rivet (140A) design and a semi-hollow rivet (140B) with shaped protruding heads (142) that can also serves as the connecting device between the concrete facing (10) and the steel stud (22). Unlike blind rivet, where a simple rivet gun is used to fasten it to steel stud, both solid rivet (140A) and semi-hollow rivet (140B) will require custom machine that apply the rivets through the pre-punched holes in the stud (22) then flatten the insert portions (141A and 141B) of the rivets behind the stud flange. The advantage in using solid rivet (140A) and semi-hollow rivet (140B) version is that it has lower manufacturing cost than blind rivet version.

Figure 10:
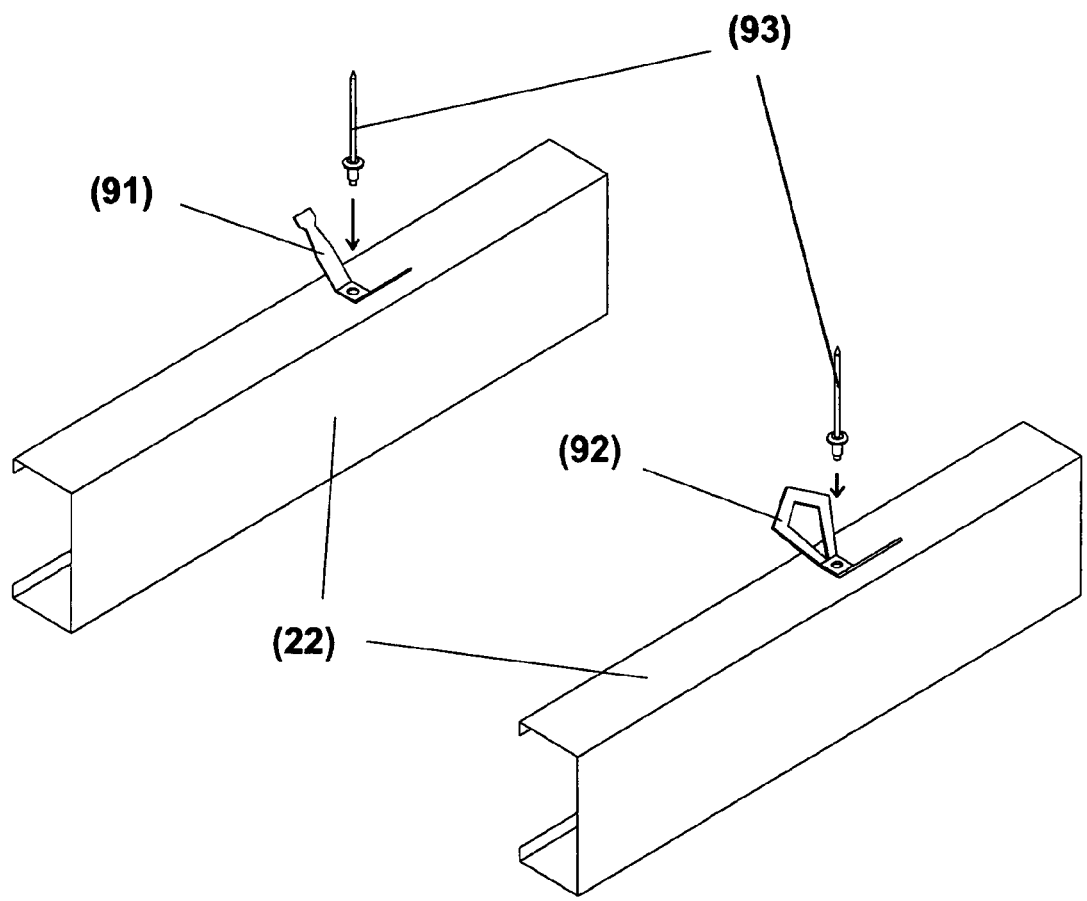
FIG. 10 illustrates another connector device type used in conjunction with an ordinary blind rivet to connect concrete to steel frame: the bent steel bracket with a hole in the center for ordinary rivet to fasten it to frame structure and with bent ends shaped to anchor itself in the concrete.

Yet another optional mean of concrete-to-frame connection disclosed in this application is the bent steel anchoring bracket (91 and 92) with hole in the center for an ordinary rivet to fasten it to frame structure and with bent ends shaped to anchor itself in the concrete. As illustrated in FIG. 10, the bent steel anchoring brackets (91 and 92) are to be used in conjunction with ordinary rivet (93) to fasten itself to the steel stud (22). The steel anchoring bracket's ends can have different shapes that help it anchor to the concrete.

Figure 6:
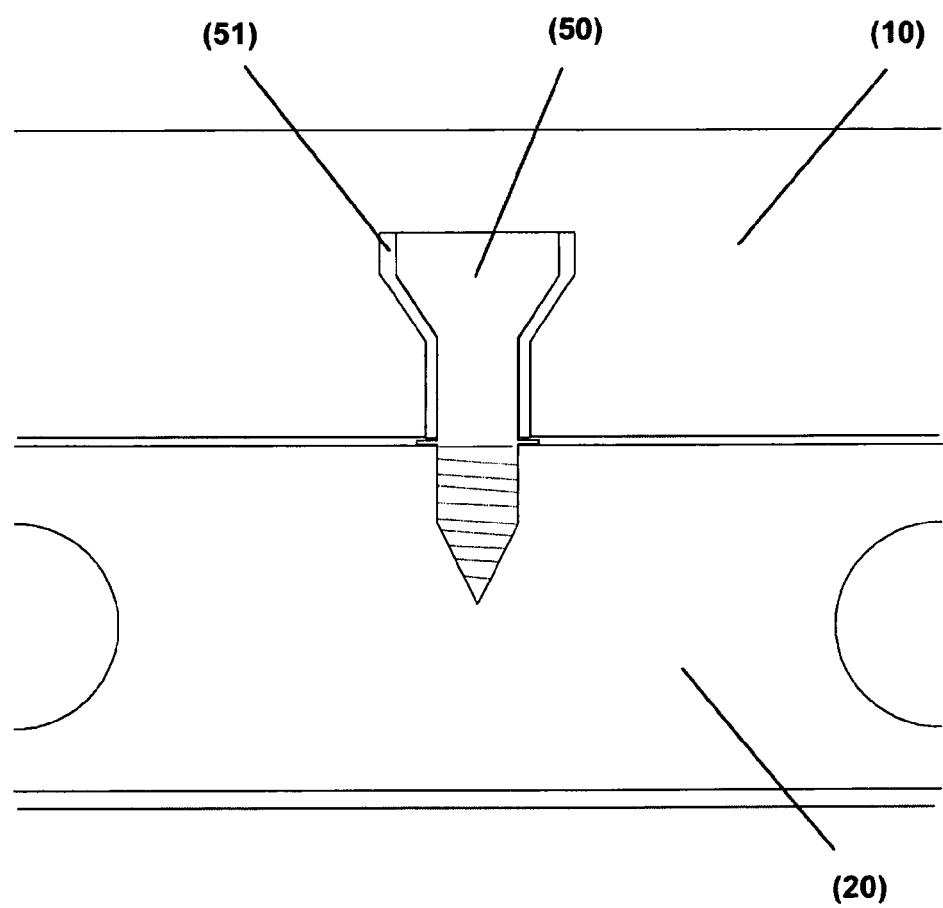
FIG. 6 illustrates a cross-section of an interior panel where a tampered head screw with elastic sleeve is the connecting device.

In cases where the hold strength of connecting device is not critical and the concrete slab (10) has slight shrinkage movement, the modified head screw (50) with the elastic covering (51) can be used as illustrated in FIG. 6.

What is claimed is:

1. A lightweight concrete panel system comprising:
   a concrete slab;
   a metal frame having a plurality of stud members arranged in parallel and spaced apart from each other, each stud member having a flange with pre-punched or pre-drilled holes; and
   a blind rivet-based anchoring device installed in each pre-punched or pre-drilled hole on the flange of each stud member to connect the metal frame to the concrete slab and to serve as an anchor in the concrete slab, the blind rivet-based anchoring device having one end connected via the flange of each stud member and the other protruding end shaped to anchor in the concrete slab; wherein the blind rivet based anchoring device has a protruding head that acts as an anchor embedded in the concrete slab.

2. The lightweight concrete panel system according to claim 1, wherein the blind rivet-based anchoring device is made of any type of steel.

3. The lightweight concrete panel system according to claim 1, wherein the blind rivet-based anchoring device is provided with an elastic cover to allow slight movement of the concrete slab and to reduce an internal stress of the concrete slab.

4. The lightweight concrete panel system according to claim 2, wherein the blind rivet-based anchoring device is provided with an elongated rivet body having a protruding head, and a mandrel inside the rivet body with a mandrel head at a blind end opposite of the protruding head,
   wherein, when inserted into the pre-punched or pre-drilled hole, the mandrel head is drawn into the blind end of the rivet body to expand the blind end of the rivet body until the mandrel snaps off, while leaving the mandrel head encapsulated at the blind end of the rivet body and thereby securing the rivet-based anchoring device in each pre-punched or pre-drilled hole on the flange of each stud member, and
   wherein, when embedded into the concrete slab, the protruding head of the rivet body shaped to act as an anchor in the concrete slab.

5. The lightweight concrete panel system according to claim 2, wherein the blind rivet-based anchoring device is provided with a first rivet body having a protruding head, a mandrel inside the first rivet body having a mandrel head at a blind end opposite of the protruding head, and a second rivet body encapsulated the first rivet body,
   wherein, when inserted into the pre-punched or pre-drilled hole, the mandrel head is drawn into the blind end of the first rivet body to expand the blind end of the first rivet body until the mandrel snaps off, while leaving the mandrel head encapsulated at the blind end of the first rivet body and thereby securing the rivet-based anchoring device in each pre-punched or pre-drilled hole on the flange of each stud member, and
   wherein, when embedded into the concrete slab, the protruding head of the first rivet body acts as an anchor in the concrete slab after the concrete hardened.

6. The lightweight concrete panel system according to claim 1, wherein the blind rivet-based anchoring device is provided with an elongated rivet body having a protruding head that effectively acts as an anchor when the protruding head is embedded in the concrete slab.

7. The lightweight concrete panel system according to claim 6, wherein the blind rivet-based anchoring device is further provided with an elastic cover to cover the rivet body so as to allow slight movement in the concrete slab.

8. The lightweight concrete panel system according to claim 6, wherein the elongated rivet body of the blind rivet-based anchoring device is one piece having a smaller outside diameter portion at a connecting end, and a larger outside diameter portion at the protruding end to anchor.

9. The lightweight concrete panel system according to claim 1, wherein the blind rivet-based anchoring device is provided with a rivet body having a protruding head, a mandrel inside the rivet body with a mandrel head at a blind end,
   wherein, when inserted into the pre-punched or pre-drilled hole, the mandrel head is secured in each pre-punched or pre-drilled hole on the flange of each stud member, and wherein, when embedded into the concrete slab, the protruding head of the rivet body acts as an anchor in the concrete slab.

10. The lightweight concrete panel system according to claim 1, wherein the blind rivet-based anchoring device is comprised of a bent steel bracket and ordinary blind rivet disposed at each pre-punched or pre-drilled hole on the flange of each stud member and used as an anchor to the concrete slab.

11. An integrated concrete panel system comprising:
a concrete slab;
a metal frame having a plurality of stud members arranged in parallel and spaced apart from each other, each stud member having a flange with pre-punched or pre-drilled holes; and
a blind rivet-based connector installed in each pre-punched or pre-drilled hole on the flange of each stud member and arranged to connect the metal frame to the concrete slab,
wherein the blind rivet-based connector is provided with an elongated rivet body having a mandrel head at one end and a protruding head at another end,
wherein the mandrel head of the rivet body is secured in each pre-punched or pre-drilled hole on the flange of each stud member of the metal frame, and
wherein the protruding head of the rivet body acts as an anchor embedded in the concrete slab.

12. The integrated concrete panel system according to claim 11, further comprising insulating strips with adhesive placed between the concrete slab and a surface of the metal frame, and made of foam plastic material having a thickness at least $1/16$" and a width no less than the flange of each stud member.

13. The integrated concrete panel system according to claim 11, further comprising a bent steel bracket disposed between the blind rivet-based connector and each pre-punched or pre-drilled hole on the flange of each stud member and used as an anchor to the concrete slab.

14. The lightweight concrete panel system according to claim 2, wherein the blind rivet based anchoring device is further provided with a rivet nut and a mandrel having one end threaded into the rivet nut; and wherein the mandrel is the protruding head shaped to anchor in the concrete slab.

* * * * *